US012614239B2

(12) United States Patent
Tatge et al.

(10) Patent No.: US 12,614,239 B2
(45) Date of Patent: *Apr. 28, 2026

(54) GEOSPATIAL AGGREGATING AND LAYERING OF FIELD DATA

(71) Applicant: AGI SureTrack LLC, Lenexa, KS (US)

(72) Inventors: Jason G. Tatge, Bucyrus, KS (US); Jonathan S. Carenza, Lees Summit, MO (US); Sarah Michelle Tynes, Kansas City, MO (US); Tyrone Avery Groves, Raytown, MO (US)

(73) Assignee: AGI SureTrack LLC, Lenexa, KS (US)

( * ) Notice: Subject to any disclaimer, the term of this patent is extended or adjusted under 35 U.S.C. 154(b) by 524 days.

This patent is subject to a terminal disclaimer.

(21) Appl. No.: 17/695,223

(22) Filed: Mar. 15, 2022

(65) Prior Publication Data

US 2022/0207623 A1      Jun. 30, 2022

Related U.S. Application Data

(63) Continuation of application No. 17/024,308, filed on Sep. 17, 2020, now Pat. No. 11,367,151.

(51) Int. Cl.
*G06Q 50/02* (2024.01)
*G06F 16/29* (2019.01)
(Continued)

(52) U.S. Cl.
CPC ............. *G06Q 50/02* (2013.01); *G06F 16/29* (2019.01); *G06Q 10/0639* (2013.01); *G06F 16/2455* (2019.01)

(58) Field of Classification Search
None
See application file for complete search history.

(56) References Cited

U.S. PATENT DOCUMENTS

| | | | |
|---|---|---|---|
| 5,978,723 A | 11/1999 | Hale et al. | |
| 9,972,058 B2 | 5/2018 | Romier | |

(Continued)

FOREIGN PATENT DOCUMENTS

| | | | | |
|---|---|---|---|---|
| CA | 2981907 A1 * | 4/2018 | ....... | G06F 17/30241 |
| CN | 110622200 A | 12/2019 | | |

(Continued)

OTHER PUBLICATIONS

Neuwirth C, Hofer B, Schaumberger A. Object view in spatialsystemdynamics: a grassland farming example. J Spat Sci. 2016;61(2):367-388. doi: 10.1080/14498596.2015.1132641 (Year: 2016).*

(Continued)

*Primary Examiner* — Mehmet Yesildag
(74) *Attorney, Agent, or Firm* — Shook, Hardy & Bacon L.L.P.

(57) ABSTRACT

Embodiments relate to storing farming activity values into geospatial containers associated with a spatial grid system, and generating data analytics therefrom. Pulse data collected by a data collection device and associated with a swath width of a farming implement can be obtained. A pulse polygon can be generated based on the swath width and location information included in the pulse data. The pulse polygon can be translated into at least one grid cell of a plurality of grid cells of a spatial grid system, such that the at least one grid cell geographically corresponds to the pulse polygon. Relevant data points extracted from the pulse data can be stored into a geospatial container generated for each grid cell of the at least one grid cell. Any of the geospatial containers can thus be selectively analyzed, independently or in combination with other geospatial containers, to derive accurate insights therefrom.

19 Claims, 7 Drawing Sheets

(51) Int. Cl.
    *G06Q 10/0639*     (2023.01)
    *G06F 16/2455*     (2019.01)

(56)                References Cited

U.S. PATENT DOCUMENTS

| | | | | |
|---|---|---|---|---|
| 9,988,012 | B2 | 6/2018 | Board et al. | |
| 10,477,756 | B1 | 11/2019 | Richt et al. | |
| 10,849,264 | B1 * | 12/2020 | Mola | G01B 21/02 |
| 11,126,937 | B2 | 9/2021 | Tatge et al. | |
| 2006/0265197 | A1 * | 11/2006 | Peterson | H04N 19/96 |
| | | | | 703/2 |
| 2013/0179026 | A1 | 7/2013 | McClure et al. | |
| 2014/0156806 | A1 * | 6/2014 | Karpistsenko | G06Q 10/06 |
| | | | | 709/219 |
| 2015/0066932 | A1 * | 3/2015 | Stuber | G06Q 50/02 |
| | | | | 707/737 |
| 2017/0046639 | A1 * | 2/2017 | Osborne | H04L 67/52 |
| 2017/0337642 | A1 | 11/2017 | Stuber et al. | |
| 2019/0050947 | A1 * | 2/2019 | Araki | G01C 7/04 |
| 2019/0138962 | A1 | 5/2019 | Ehlmann et al. | |
| 2019/0347745 | A1 | 11/2019 | Bones et al. | |
| 2020/0154639 | A1 * | 5/2020 | Takahara | A01B 79/005 |
| 2020/0167703 | A1 | 5/2020 | Tatge et al. | |

FOREIGN PATENT DOCUMENTS

| | | | |
|---|---|---|---|
| EP | 3971816 | B1 | 11/2024 |
| JP | 2007-310463 | A | 11/2007 |
| JP | 2014-187954 | A | 10/2014 |
| JP | 2014-194653 | A | 10/2014 |
| JP | 2018165989 | A | 10/2018 |
| JP | 2019-008613 | A | 1/2019 |
| JP | 2020004438 | A | 1/2020 |
| RU | 194188 | U1 | 12/2019 |
| WO | 2015/042540 | A1 | 3/2015 |

OTHER PUBLICATIONS

"ISO 11783—Tractors and machinery for agriculture and forestry—Serial control and communications data network", Wikipedia, Retrieved from Internet URL : https://en.wikipedia.org/wiki/ISO _ 11783, accessed on Aug. 26, 2022, pp. 2.

"SAE J1939", Retrieved from Internet URL : https://web.archive.org/web/20170306131023/https://www.wikiwand.com/en/SAE_J1939, accessed on Aug. 26, 2022, pp. 3.

Neuwirth, C., et al., "Object view in spatial system dynamics: a grassland farming example", Journal of Spatial Science, vol. 61, No. 2, pp. 367-388 (2016).

Notice of Acceptance received for South African Patent Application No. 2021/06852, mailed on Jun. 6, 2022, 1 page.

1 Office Action received for European Patent Application No. 21196815.1, mailed on Feb. 16, 2024, 11 pages.

Notice of Acceptance received for South African Patent Application No. 2021/06852, mailed on Oct. 18, 2023, 1 page.

First Examination Report received for Australian Patent Application No. 2021232730, mailed on Sep. 5, 2022, 2 pages. (English Translation Submitted).

Notice of Acceptance received for Australian Patent Application No. 2021232730, mailed on Sep. 21, 2022, 3 pages. (English Translation Submitted).

Office Action and Search received for Russian Patent Application No. 2021127004, mailed on Sep. 30, 2022, 15 pages. (English Translation Submitted).

Notice of Allowance received for Canadian Patent Application No. 3131262, mailed on Oct. 21, 2022, 1 page. (English Translation Submitted).

Decision to Grant received for Russian Patent Application No. 2021127004, mailed on Feb. 1, 2023, 20 pages. (English Translation Submitted).

Extended European Search Report and Opinion received for European Patent Application No. 21196815.1, mailed on Feb. 15, 2022, 8 pages.

Office Action received for Chinese Patent Application No. 202111090551.8, mailed on Feb. 22, 2024, 8 pages (3 pages of Original OA and 5 pages of English Translation).

Notice of Allowance received for Chinese Patent Application No. 202111090551.8, mailed on May 15, 2024, 4 pages (2 pages of Original OA and 2 pages of English Translation).

Office Action received for Brazilian Patent Application No. 102021018136-2, mailed on Feb. 8, 2024, 4 pages of original copy only.

Intention to Grant received for European Application No. 21196815.1, mailed on Jul. 3, 2024, 6 pages.

Office action received for Ukrainian Patent Application No. A202105175, mailed on Sep. 18, 2024, 11 pages (5 pages of Original OA and 6 pages of English Translation).

Office action received for Ukrainian Patent Application No. A202105175, mailed on Dec. 16, 2024, 4 pages (2 pages of Original OA and 2 pages of English Translation).

Notice of Allowance received for Ukrainian Patent Application No. A202105175, mailed on Feb. 13, 2025, 17 pages (9 pages of original copy and 8 pages of English Translation).

Notice of Opposition received for European Patent Application No. 21196815.1, mailed on Aug. 25, 2025, 26 pages.

Office Action received for Brazilian Patent Application No. 102021018136-2, mailed on Aug. 18, 2024, 5 pages (3 pages of Original OA and 2 pages of English Translation).

Office Action received for Paraguayan Patent Application No. 81696/2021, mailed on Apr. 28, 2025, 5 pages of Official Copy.

* cited by examiner

CLIENT
DEVICE, 120

DATA COLLECTION
DEVICE, 200

NETWORK, 150

DATA
TRANSLATION
SYSTEM, 300

DATA
ANALYTICS
SYSTEM, 700

DATA
STORE,
110

DATA COLLECTION DEVICE, 200

RAW DATA COLLECTING COMPONENT, 210

LOCATION DETECTING COMPONENT, 220

GEO-TAGGING COMPONENT, 230

COMMUNICATIONS COMPONENT, 240

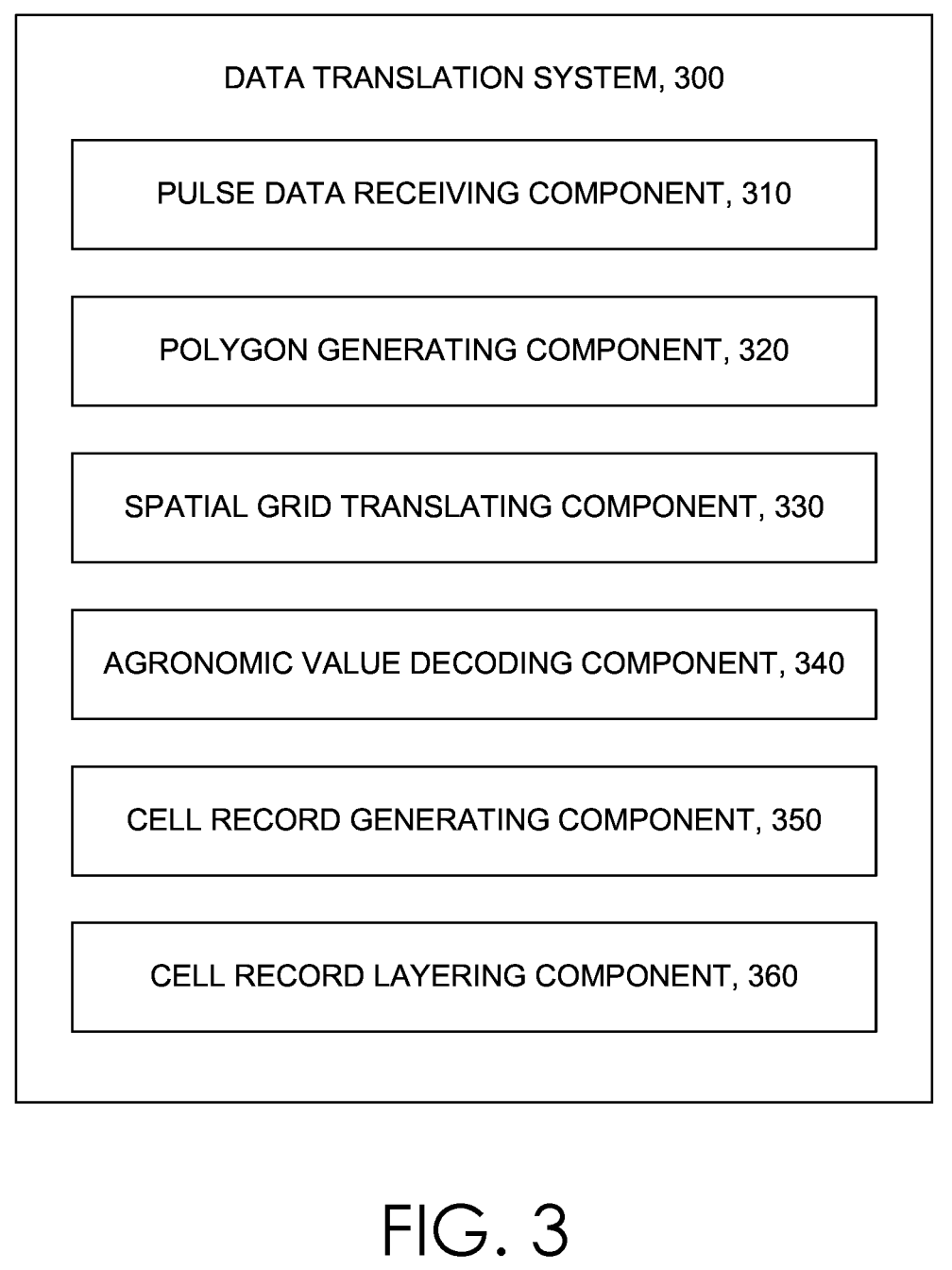

DATA TRANSLATION SYSTEM, 300

PULSE DATA RECEIVING COMPONENT, 310

POLYGON GENERATING COMPONENT, 320

SPATIAL GRID TRANSLATING COMPONENT, 330

AGRONOMIC VALUE DECODING COMPONENT, 340

CELL RECORD GENERATING COMPONENT, 350

CELL RECORD LAYERING COMPONENT, 360

FIG. 3

Harvesting
12 rows | 30 in/row
30 ft swath
4 mph – 5.87 ft/sec

Tillage
22 rows | 22 in/row
40 ft swath
6 mph – 8.8 ft/sec

Planting
24 rows | 30 in/row
60 ft swath
4.5 mph – 6.6 ft/sec

Spreading
2 sections | 37.5 ft/section
75 ft swath width
15 mph – 22 ft/sec

Spraying
7 sections | 14.3 ft/section
100 ft swath width
12 mph – 17.6 ft/sec

Grid
30 ft x 30 ft

600

630

620

610

Z

Y

X

DATA ANALYTICS SYSTEM, 700

QUERY GENERATION COMPONENT, 710

QUERY PROCESSING COMPONENT, 720

DATA ANALYTICS COMPONENT, 730

PRESENTATION COMPONENT, 740

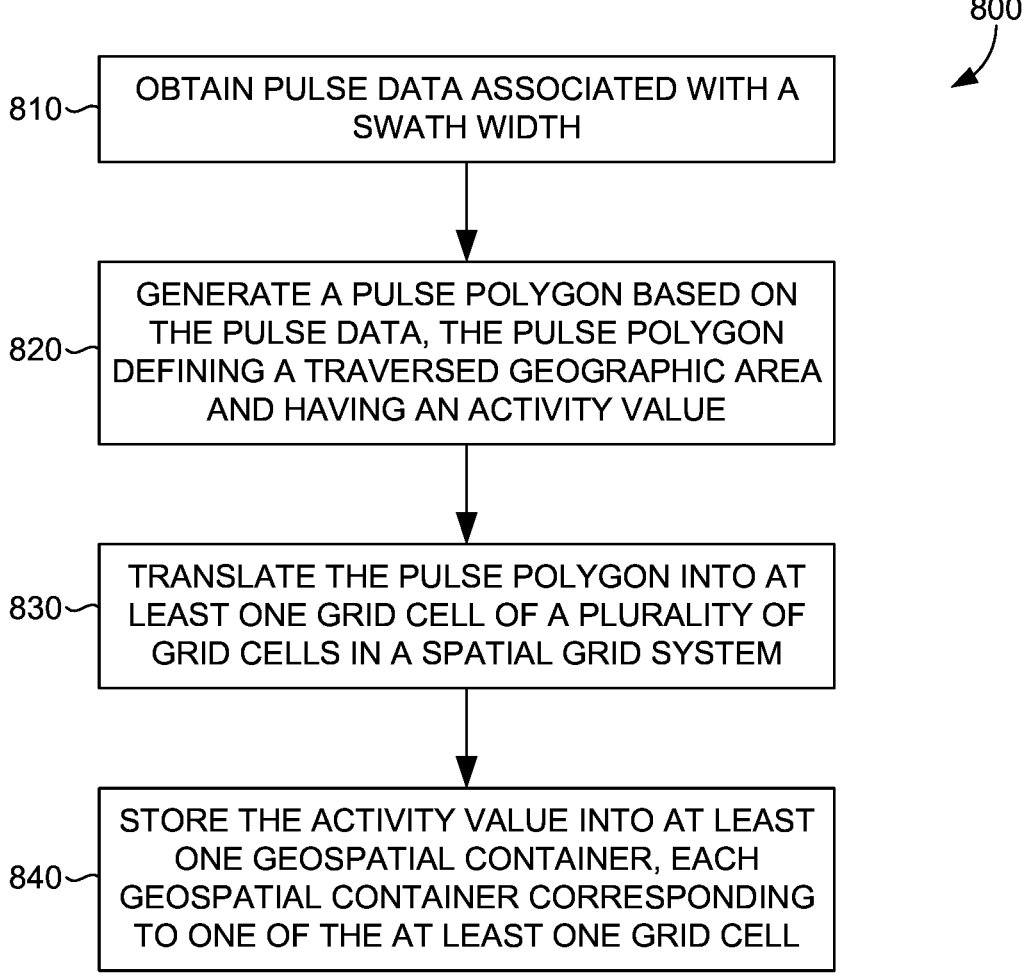

_800_

810 — OBTAIN PULSE DATA ASSOCIATED WITH A SWATH WIDTH

820 — GENERATE A PULSE POLYGON BASED ON THE PULSE DATA, THE PULSE POLYGON DEFINING A TRAVERSED GEOGRAPHIC AREA AND HAVING AN ACTIVITY VALUE

830 — TRANSLATE THE PULSE POLYGON INTO AT LEAST ONE GRID CELL OF A PLURALITY OF GRID CELLS IN A SPATIAL GRID SYSTEM

840 — STORE THE ACTIVITY VALUE INTO AT LEAST ONE GEOSPATIAL CONTAINER, EACH GEOSPATIAL CONTAINER CORRESPONDING TO ONE OF THE AT LEAST ONE GRID CELL

MEMORY

912

PROCESSOR(S)

914

PRESENTATION
COMPONENT(S)

916

RADIO(S)

924

I/O PORT(S)

918

I/O COMPONENTS

920

POWER SUPPLY

922

910

GEOSPATIAL AGGREGATING AND LAYERING OF FIELD DATA

CROSS REFERENCE TO RELATED APPLICATIONS

The present application is a continuation of and claims priority from application Ser. No. 17/024,308, filed Sep. 17, 2020, which is assigned or under obligation of assignment to the same entity as this application, the entire contents of the application being herein incorporated by reference.

BACKGROUND

Recent advancements in farming machinery have given rise to an unforeseen use case for data. More specifically, work data generated by farming machinery has sparked a new generation of technologies that can provide valuable analytical insight into farm land, harvest yields, farming methodologies, and more.

SUMMARY

Embodiments of the present invention generally relate to improved techniques for aggregating field data (e.g., machine data, agronomic data, farming data) related to farming, obtained from any number of sources in any number of formats, so that the data therein can be organized and stored into geospatial containers for efficient and platform-independent processing. The various field datasets, when translated into geospatial containers, can facilitate compatible data transfer between discrete analytics systems, and can even facilitate data analytics with enhanced precision, among other things.

In some embodiments, sensor data collected from a farming machine can be dynamically converted into discrete polygons that correspond to geographic areas traversed by an implement coupled to the farming machine. Such polygons can have, stored therein or stored in association therewith, a work dataset determined based on the sensor data received from the farming machine at one or more times the sensor data was collected. A work dataset can include, among other things, machine data and/or agronomic data. Machine data can include CAN data, which can be generated by the farming machine and collected by a sensor device coupled to the farming machine. By way of example, machine data can include machine speed, temperature, or any other data points relevant to the farming machine. In some aspects the machine data can include activity data, which measures a certain amount of a particular activity or operation performed by the farming machine or implement coupled thereto. Agronomic data can, in some instances, be collected by the sensor device, or can be collected by other data collection devices (e.g., IoT devices, satellites, weather measuring tools) in communication with the farming machine, sensor device, or other data collection device. In some aspects, agronomic data can include activity data, which can include additional details, sensed or defined, and relating to the work or activity being performed. For instance, agronomic data may include, by way of non-limiting example, seed variety or type, pesticide type, irrigation amount, and more.

In some other embodiments, other types of data related to farming can be converted into polygonal zones that correspond to geographic areas. These other types of data may include farming data that is relevant to a plot of land being farmed, or in other words, relevant to any of the geographic areas traversed by an implement coupled to a farming machine. The polygonal zones can have, stored therein or in association therewith, various types of farming datasets that may be relevant to the geographic area (e.g., the land). For instance, farming datasets can include farming dataset values having a variety of data types, such as soil data (e.g., soil compositions), weather data (e.g., rain levels, humidity levels), irrigation data (e.g., irrigation volume), satellite imagery, and the like. In essence, farming datasets can include data relating to the various factors that can impact, among other things, yield or production of crop on the plot of farmed land. In some embodiments, the farming datasets can be associated with temporal markers (e.g., timestamps) that indicate a time and/or date that the farming dataset is associated with.

In some further embodiments, the polygons and/or polygonal zones can be stored into a data repository, such as a database, so that they can be efficiently converted into discrete geospatial containers that correspond to grid cells of a selected spatial grid system. In some aspects, the spatial grid system can be selected from a plurality of spatial grid systems, so that work dataset(s) and/or farming dataset(s) relating to specific areas of land can be converted into, exported as, or analyzed in accordance with a variety of spatial grid systems.

In some even further embodiments, the selection of a spatial grid system can cause the work dataset(s) and/or farming dataset(s) in the polygons and/or polygonal zones to be translated into geospatial containers associated with a selected spatial grid system. Specifically, a spatial grid system can include a plurality of unique identifiers that can be utilized to reference one of a plurality of smaller geographic areas within the grid system, otherwise known as grid cells. Thus, when polygons and/or polygonal zones corresponding to larger geographic areas are translated into geospatial containers, embodiments herein can identify the specific grid cells of the plurality of grid cells that correspond to the polygons and/or polygonal zones, and generate a plurality of geospatial containers that each corresponds to one of the specific grid cells that belong to or "fit" inside one of the polygons and/or polygonal zones. In this way, the work datasets and/or farming datasets of the polygons and/or polygonal zones can be stored into corresponding geospatial containers. In some aspects, data extracted from work dataset(s) and/or farming dataset(s) from a polygon and/or polygonal zone can be stored as a unique layer within a corresponding geospatial container. As will be described herein, the translation of work datasets and/or farming datasets into discrete geospatial containers of a spatial grid system can facilitate enhanced accuracy of data analytics down to the individual grid cell level, provide cross-platform compatibility, and even provide the ability to generate real-time updates on analytics reports, charts, or maps, among other things.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is an exemplary data translation system in accordance with some embodiments of the present invention;

FIG. 8 is a flow diagram showing a method for translating sensor data into at least one grid cell of a spatial grid system in accordance with some embodiments of the present invention.

DETAILED DESCRIPTION

Figures 1, 2:
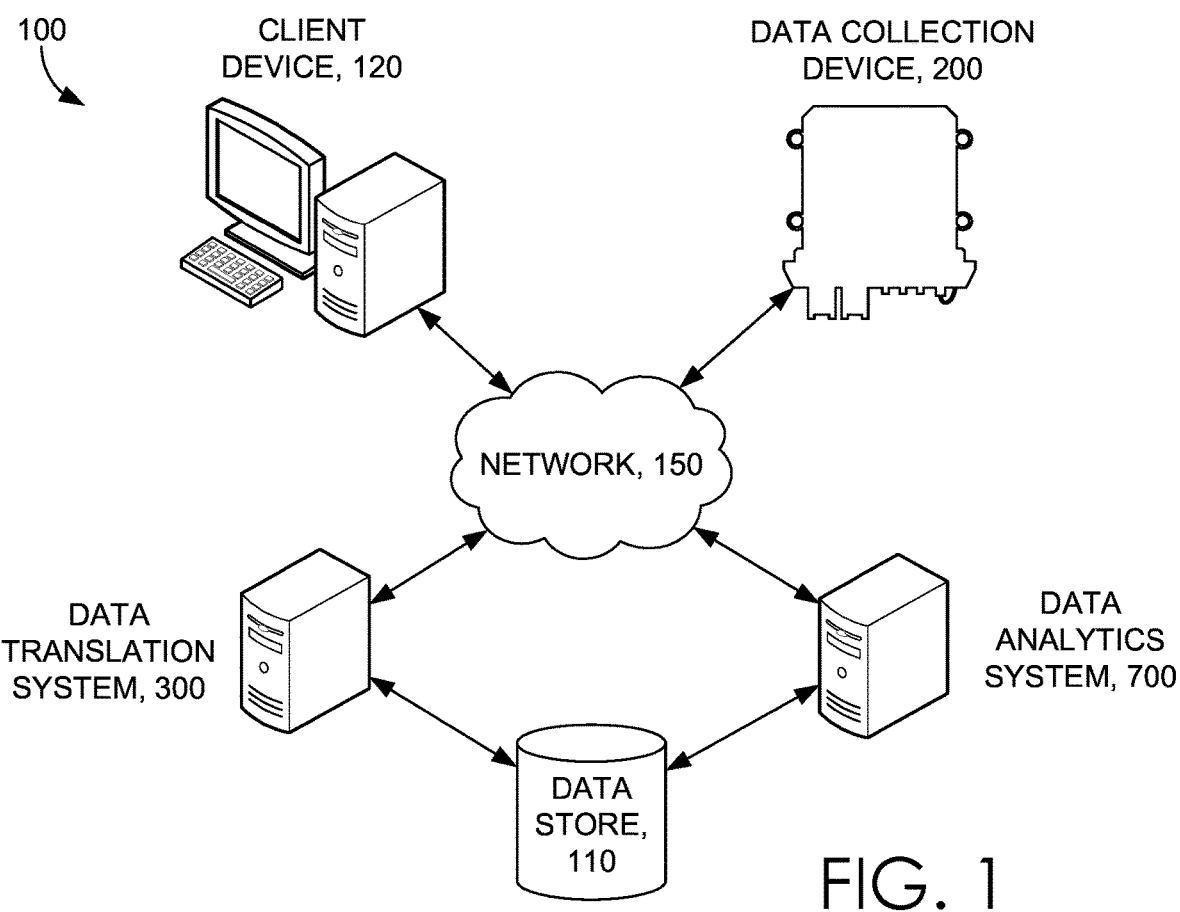
FIG. 1 is an exemplary system diagram in accordance with some embodiments of the present invention.
FIG. 2 is an exemplary data collection device in accordance with some embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The amount of data generated by devices, whether electrical or mechanical, can be astounding. With the vast amounts of processing power readily-available, given the advancement of computing technologies over recent years, such data can be harnessed to derive operational insights that were once thought to be impossible. The farming industry was once believed to be an industry that was far removed from computing technologies. However, sophisticated electrical devices began to find their way into farming machines (e.g., tractors) and farming implements. At the same time, the ability to generate, collect, and derive insights from data, generally, ignited an emergence of technology companies striving to enhance and optimize the process of collecting, aggregating, and analyzing various types of work datasets and/or farming datasets to derive interesting insights therefrom.

Farming datasets can include a variety of data types from a variety of sources. At the highest level, electronic information relevant to farming, such as satellite imagery, weather data, soil data, and the like, can be collected independently with data collection devices or obtained from third party sources. In many instances, such information can be imported in a variety of formats and without geographic specificity. In some instances, however, such information can be collected with smart data collection devices, such as Internet of Things ("IoT") devices, by way of example. While data from IoT devices can be collected with a greater degree of geographic and/or temporal specificity, the data may still be limited to regions or larger plots of land. To this end, certain devices have been developed to collect ground truth data, otherwise known as work datasets, with a much greater degree of accuracy, e.g., with greater geographic and/or temporal specificity.

One such company, Farmobile LLC, of Leawood, Kans., has developed a product that enables farmers to collect certain types of work datasets, specifically, machine and/or agronomic data. Details relating to a data collection device, which can be coupled to farming machinery to collect machine and/or agronomic datasets from farming machinery can be found in pending U.S. patent application Ser. No. 15,794,463, which is assigned or under obligation of assignment to the same entity as this application, the entire contents being herein incorporated by reference. Farmobile's data collection device can be used to collect machine data and/or agronomic data, in addition to location and time associated with the machine data and/or agronomic data, among other things. More specifically, the data collection device can facilitate access to precise information relating to a type of farming activity (i.e., operation) performed by a farming machine and/or implement, a location the farming activity was performed, and a time the farming activity was performed, among other things, each of which can be directly associated with the collected machine and/or agronomic data. In some aspects, the type of farming activity performed by a farming machine can depend on a type of implement coupled to the farming machine at the time the activity was performed. To this end, depending on the implement(s) coupled to the farming machine, the machine and/or agronomic data collected by the data collection device can sometimes include different types of machine and/or agronomic data, such as data relating to harvesting, spreading, spraying, planting, foraging, baling, or tillaging, among many other farming operations or "activities" that may be performed by the farming machine and/or one or more implements coupled to the farming machine.

As one familiar with the industry may appreciate, there are a number of different formats in which farming datasets can be structured. Not to mention, other data collection devices (e.g., from other manufacturers) may obtain and store work datasets (i.e., machine data and/or agronomic data) into entirely different formats. In order to derive useful insights from farming data, such as work datasets and farming datasets, it is important that the data be accurately organized such that the data points therein are geographically and temporally accurate. While work datasets collected by a data collection device can be formatted, such work datasets are typically structured per manufacturer specifications. Similarly, farming datasets can be formatted in a variety of shapes or sizes, collected with or without geographic specificity.

To this end, embodiments described herein generally relate to the collection, storage, and subsequent translation of varying types of field data (e.g., work datasets, farming datasets) into an easily-interpretable format that may correspond to a selected one of a plurality of spatial grid systems. More specifically, work datasets and/or farming datasets from various sources can be obtained, formatted, stored, and eventually translated down into one or more geospatial containers that each correspond to one of a plurality of grid cells of a selected spatial grid system. As will be described herein, different work datasets and/or farming datasets that correspond to a particular grid cell can be stored as discrete layers of a corresponding geospatial container. By translating various work datasets and/or farming datasets associated with a portion of land, and further storing those datasets into a geospatial container corresponding to that portion of land, insights relating specifically to that portion of land can be derived more efficiently and accurately when compared to conventional methods. In some instances, generating compartmentalized geospatial containers and storing work datasets and/or farming datasets in this manner may even facilitate the ability to derive analytical insights of farming operations in real-time, as new layers of data are being added to corresponding geospatial containers. Moreover, the ability to translate the various work datasets and/or farming datasets into a variety of spatial grid systems can facilitate cross-platform compatibility, data uniformity, and even the ability to compare insights derived from different spatial grid systems. In essence, the translating of disparate datasets (any of which may be associated with variable geographic and temporal identifiers relevant to a user's land) into geographically-specific geospatial containers that each corresponds to a grid cell of a spatial grid system can facilitate universal system compatibility and the calculation of targeted analytics, among other things.

Turning now to FIG. 1, a schematic depiction is provided illustrating an exemplary system 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 depicted in FIG. 1 includes a user client device 120 that can communicate with a data translation system 300 over a network 150, such as the Internet. Each of the user client device 120 and data translation system 300 can include a computing device, as described in more detail with respect to FIG. 9. The system preferably includes a network 150 that enables communication between at least one data collection device (e.g., data collection device 200), at least one server device (e.g., data translation system 300), and at least one client device (e.g., client device 120). In some embodiments, the system can include a data analytics system, such as data analytics system 700. In various embodiments, the network can include one or more networks including, but not limited to, the Internet, WANs, LANs, PANs, telecommunication networks, wireless networks, wired networks, and the like.

The data collection device 200 can collect work datasets (e.g., machine data, agronomic data) from one or more pieces of farming machinery (e.g., a tractor having one or more implements coupled thereto). The data collection device 200 can periodically (e.g., every second) collect work datasets from the farming machinery while a farming machinery operation is being performed, store it to a memory, and/or communicate the collected work datasets to a server device (e.g., data translation system 300) for storage in association with a user account. In some aspects, the collected work datasets can be transmitted (e.g., in bulk, or for each collection period) directly or indirectly to the data translation system 300 over the network. In some embodiments, for each period otherwise referred to herein as a "pulse," the farming dataset(s) collected within the period can include dataset(s) otherwise referred to herein as "pulse data" or "a pulse dataset." Pulse data communicated from the data collection device 200 to the server device is preferably defined in a format that can clearly identify a location at which the pulse data was collected, and a work value (e.g., farming activity value) output by the farming machinery at the time of the pulse. In some aspects, the work value can include CAN data output by the farming machinery, among other things. In various embodiments, the CAN data can be associated with one or more communications standards, such as ISO 11783 or J1939, by way of non-limiting example. In some further aspects, a work value can define a value or amount of activity performed by the farming machinery or implement at or during the time of the pulse. To this end, pulse data can include a work value output by the farming machinery (i.e., by a computer or central control unit of the farming machinery) at the time of the pulse, a timestamp corresponding to the time of the pulse, and a location (e.g., GPS coordinates) of the data collection device detected at the time of the pulse. It is contemplated that the type of work value output by the farming machinery could vary at any time depending on the operation being performed by the farming machinery and/or the implement(s) coupled to the farming machinery.

In some embodiments, the data translation system 300 can receive the pulse data and store it to a memory or memory device, such as the data store 110. The pulse data can be stored in association with a user account associated with the data collection device 200. The data translation system 300 can include, among other things, at least one computing device, such as the computing device described in accordance with FIG. 9. The data translation system 300 can include at least one device configured to structure, store, translate, and/or analyze collected work datasets (e.g., pulse data) and/or farming datasets, among other things. In some aspects, the data analytics system 700 can be one of these devices.

In some embodiments, a user can employ the client device 120 to define a swath width of the implement utilized for certain farming operations performed. The client device 120 can communicate with data translation system 300, data analytics system 700, and/or other server device (not shown), over the network 150, to define the swath width of the implement associated with the work data collected during utilization of the implement. In some other embodiments, the data collection device 200, data translation system 300, data analytics system 700, and/or other server device (not shown) can, based on the work data collected during a farming operation, automatically determine a swath width of the implement used to perform the farming operation. Details relating to the automatic determination of swath width can be found in pending U.S. patent application Ser. No. 16/418,632, which is assigned or under obligation of assignment to the same entity as this application, the entire contents being herein incorporated by reference.

Utilizing the pulse data received for each pulse, in addition to the swath width of the implement associated with the pulse data, the data translation system 700 can generate a pulse polygon that defines a geographic area traversed by the implement during the pulse period. The data translation system 700 can also generate, utilizing the pulse data received for the pulse, an activity value corresponding to the traversed geographic area, among other things. As will be described herein, the data translation system 700 can generate a pulse polygon that corresponds to a geographic area traversed by the farming machine and implement within a pulse period. The pulse polygon can be generated utilizing the swath width of the implement, location from a first pulse as a starting point, location data from a second pulse immediately following the first pulse as an ending point, and activity data associated with the first and/or second pulse, among other things. Each pulse polygon generated by the data translation system can be stored in a memory, such as the data store, and utilized for immediate translation into a selected one of a plurality of spatial grid systems.

In some embodiments, a user (e.g., a farmer) of the client device 120 can select a particular spatial grid system (e.g., Mardsen Squares, World Meteorological Organization squares, c-squares, UTM coordinate system, British national grid reference system, Quatermary Triangular Mesh, Google S2, Uber H3, among others) to serve as an underlying spatial index for organizing and analyzing his or her work data and/or agronomic data.

When the particular spatial grid system is selected, the data translation system 300 can map each pulse polygon to one or more grid cells of the selected spatial grid system. That is, the geographic area of each pulse polygon can be mapped to a corresponding set of grid cells of the selected spatial grid system. In some embodiments, the data translation system 300 can generate unique data structures, called geospatial containers, for each grid cell in the corresponding set of grid cells, such that each geospatial container can correspond to one grid cell of the selected spatial grid system. A geospatial container can include a unique identifier, such as a unique identifier that corresponds to a grid cell of a particular spatial grid system. The unique identifier can be employed to identify and locate a specific grid cell in the spatial grid system, and can thus be employed to identify the geographic location of which the geospatial container is associated with. In some aspects, the geospatial container can store work data or work datasets, such as activity values or other types of electronic information relevant to farming. For instance, an activity value of a pulse polygon from which a geospatial container was generated can be stored within the geospatial container. Each work dataset can be stored into different and separate portions of a geospatial container, such as in a separate layer or compartment of the geospatial container, by way of example. Each portion of the geospatial container can be defined or indexed within the geospatial container utilizing a variety of factors, such as date, time, source, operation, machine, or operator, among other things.

In a similar manner, the data translation system 300 can map imported farming datasets and agronomic data to the one or more grid cells of the selected spatial grid system. That is, the geographic area of each farming dataset or agronomic dataset can be mapped to a corresponding set of grid cells of the selected spatial grid system. That is, certain farming datasets (e.g., soil data, weather data, irrigation data, satellite imagery) may be associated with a defined geographic area. For instance, a farmer may import weather data for his or her locality, and while not limited to the farmer's land, the farmer's land can be within the locality of which the weather data is associated. In some instances, the imported weather data can be generalized such that the data applies to the entire locality. In some other instances the weather data can be geographically specific, such that the data may vary based on geographic areas of the locality. To this end, the data translation system 300 can identify the geospatial containers associated with grid cells inside the farmer's land, and utilize the geospatial containers to store the corresponding weather data, which can be associated with a date and time, among other things. Like activity values, the imported weather data can be stored within a geospatial container, into a different and separate portion of the geospatial container.

When work datasets and/or farming datasets are broken down and stored into geospatial containers that are associated with a particular spatial grid system, a variety of computing resource optimizations can be realized. For instance, a data analytics system, such as data analytics system 700, can derive insights on narrowly-defined geographic areas without requiring analysis on larger datasets associated with larger portions of land. By way of example, a user of the client device 120 could access the data analytics system 700, define very specific geographic areas by encircling or generally selecting an area of interest on a map view of land, and the data analytics system could analyze only the geospatial containers that are determined to be located within the encircled area of interest. In other words, the farming datasets stored in the geospatial containers determined to be within a defined area of interest can be analyzed to derive insights that are geographically-specific. This technique is a significant improvement over conventional technologies, which do not have the capability of deriving insights for geographic areas on a granular level. In addition, the ability to include ground truth data (i.e., work datasets), agronomic datasets, and farming datasets into geospatial containers facilitates the derivation of more accurate insights than conventional methodologies, both geographically and mathematically.

Referring now to FIG. 2, a block diagram is provided depicting an exemplary data collection device 200 in accordance with some embodiments of the present disclosure. The data collection device 200 can be associated with a unique identifier, such as a hardware ID, serial number, or electronic identifier, among other things. In some embodiments, the unique identifier can be encoded into hardware and/or software of the data collection device 200. In some further embodiments, the unique identifier can be associated with a user account, such that a logical or symbolic mapping there between is maintained in a memory of a server, such as server device 310 of FIG. 1.

Figure 9:
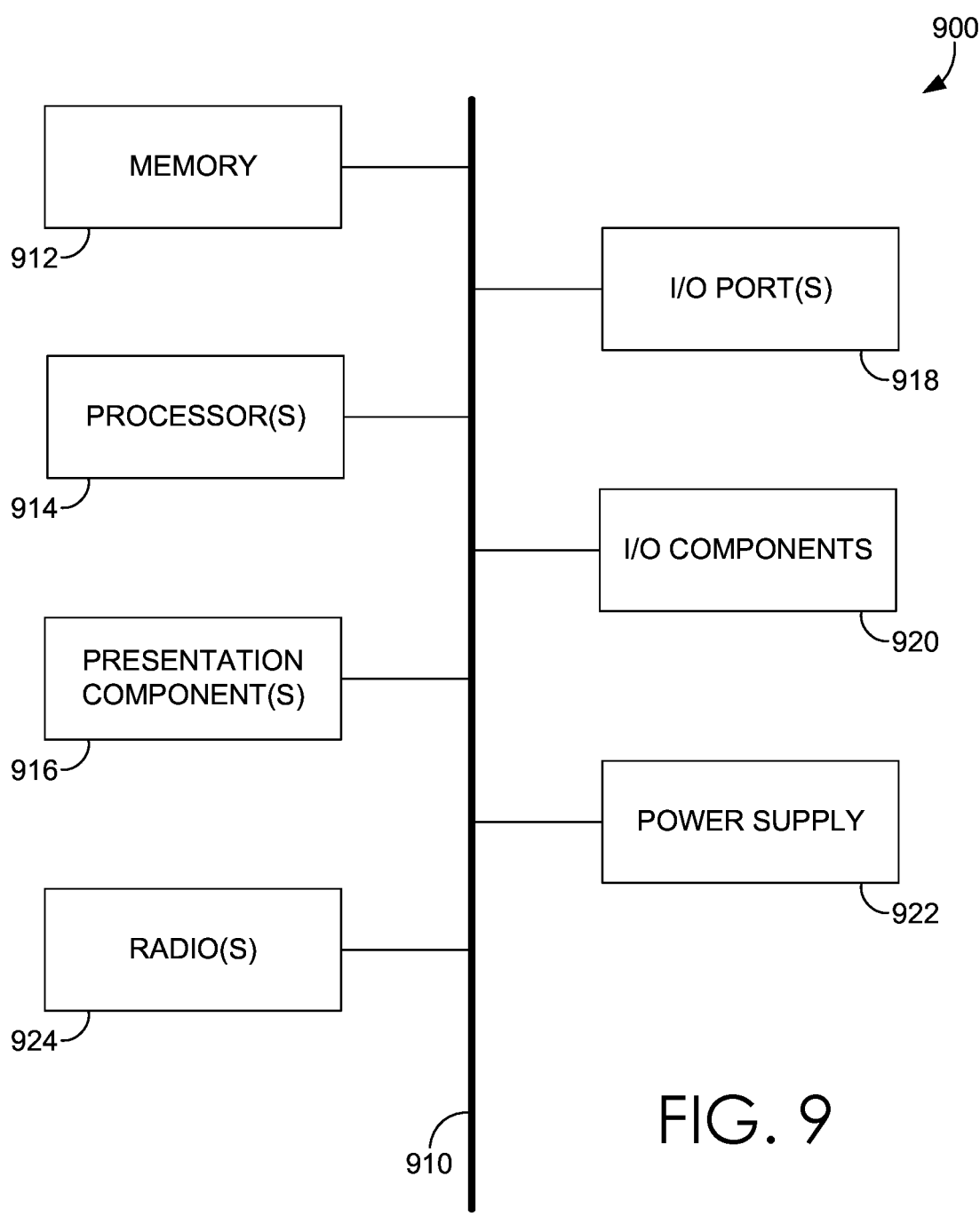
FIG. 9 is a block diagram of an exemplary computing environment suitable for use in implementing some embodiments of the present invention.

In accordance with various embodiments, data collection device 200 can include at least one computing device described in accordance with FIG. 9, and can be coupled to one or more sensors, computing devices, electric lines, modules, or other sensor data and/or farming data-collecting, and/or work data-generating electronics (herein collectively referred to as "sensors") associated with a piece of farming machinery and/or implements coupled thereto. In some embodiments, the data collection device 200 can include at least one input port for receiving and storing the collected work datasets and/or farming datasets in a memory (e.g., a data storage device), and at least one output port for passing through the received work datasets and/or farming datasets to a computing device associated with the piece of farming machinery. The data collection device 200 can also be coupled to a power source, such as a battery or a power source associated with the piece of farming machinery. The data collection device 200 can further include, among other things, a raw data collecting component 210, a location detecting component 220, a geo-tagging component 230, and a communications component 240.

In some embodiments, the raw data collecting component 210 can receive work datasets (e.g., activity data, CAN data) communicated from the sensors to an input port of the data collection device 200. The raw data collecting component 210 can store the received work datasets into a cache or a memory. The data collection device 200 can further include a location detecting component 220 that can detect a physical location of the data collection device 200. In some embodiments, the location detecting component 220 can include a GPS module for determining GPS coordinates, a Wi-Fi antenna for detecting nearby Wi-Fi signals, a cellular radio for detecting nearby telecommunication towers, a Bluetooth radio for detecting nearby Bluetooth radios, or any other location detecting technology for determining a precise or approximate location of the data collection device 200 at any given time.

In some embodiments, the data collection device 200 can employ the location detecting component 220 to determine a location of the data collection device 200 in accordance with receiving work datasets via the raw data collecting component 210. In other words, at substantially the same time as receiving a work dataset via raw data collecting component 210, the data collection device 200 can determine the location of data collection device 200. The location can be determined at any time at or between the start and end of a pulse period. In some embodiments, a work dataset and each piece of determined location information can be independently timestamped, such that the data collection device 200 can associate a received work dataset to one or more pieces of determined location information. In this regard, the data collection device 200 can employ a geo-tagging component 230 to "tag" (e.g., map, embed into, modify) each received work dataset with one or more pieces of determined location information. In other words, each received work dataset can be tagged with at least one location of the data collection device 200 determined at a time the work dataset was collected by the data collection device 200. The work dataset being geo-tagged by geo-tagging component 230 and timestamped by the data collection device 200 for one pulse period (e.g., 1 second interval) can be referenced herein as pulse data or a pulse dataset. The received work dataset being geo-tagged by geo-tagging component 230 and stored in a cache or memory of the data collection device 200 can be referenced herein as collected work data or a collected work dataset.

In some further embodiments, the data collection device 200 can include a communications component 240, which facilitates the wired and/or wireless communication of the collected work datasets to a data translation system, such as data translation system 300 of FIGS. 1 and 3. In some embodiments, the data collection device 200 can communicate the collected pulse data to the data translation system in substantially real time (e.g., within 1 second), such that the collected pulse data is effectively streamed or periodically communicated to the data translation system 300. In some other embodiments, the data collection device 200 can communicate the collected pulse data to the data translation system 300 when a communications signal (e.g., Wi-Fi signal, Bluetooth signal, cellular signal) is available to the communications component 240. In this regard, the received work datasets can continue to be geo-tagged and stored in a memory or cache of the data collection device 200, such that when the communications signal is available, the communications component 240 can establish a signal with the data translation system and communicate the collected pulse data to the data translation system 300.

In some embodiments, the communications component 240 can communicate the unique identifier associated with the data collection device 200 prior to or in conjunction with any portion of collected pulse data communicated to the data translation system 300. In some other embodiments, the geo-tagging component 230 can include metadata including the associated unique identifier when "tagging" the received work dataset(s). In this way, the data translation system can determine that the collected pulse data being received is associated with the data collection device 200, and can further determine that the collected work dataset(s) being received is associated with a user account associated with the data collection device 200.

With reference to FIG. 3, a block diagram is provided depicting an exemplary data translation system 300 in accordance with some embodiments of the present disclosure. The data translation system 300 can include at least one computing device described in accordance with FIG. 9, and can further include a pulse data receiving component 310, a polygon generating component 320, a spatial grid translating component 330, an agronomic value decoding component 340, a cell record generating component 350, a cell record surveying component 360, and a cell record layering component 370. As was described herein, work dataset(s) collected by, timestamped, and tagged by data collection device 200 for one pulse period (i.e., "pulse data" or "a pulse dataset") can be received by the data translation system 300 via the pulse data receiving component 310. In some aspects, the pulse data receiving component 310 can receive a pulse dataset from a data collection device 200 as each dataset is generated and transmitted. In some other aspects, the pulse data receiving component 310 can receive the pulse dataset(s) from the data collection device 200 in bulk.

As each pulse dataset corresponds to one of a plurality of time intervals or "pulses," it is contemplated that the pulse datasets are sequentially ordered by their respective timestamps. As will be described in more detail with respect to FIG. 5, a first pulse dataset can include a first detected location ($l_1$), a first time (t1), and a first activity data or value ($d_1$) collected from the farming machinery at the first time. The pulse dataset that is generated by the data collection device 200 immediately after the first pulse dataset can be a second pulse dataset that includes a second detected location ($l_2$), a second time ($t_2$), and a second activity data or value ($d_2$) collected from the farming machinery at the second time immediately following the first time. Utilizing the first pulse dataset and the second pulse dataset, in addition to a defined or determined swath width of the implement associated with the first and second pulse datasets, a polygon generating component 320 of the data translation system 300 can generate a pulse polygon that represents, among other things, an activity value for a specific geographic area, the specific geographic area being defined based at least in part on the first detected location, the second detected location, and the swath width. In other words, a pulse polygon can represent a geographic area that was traversed by the farming machinery and/or implement during a timeframe defined by the first time and the second time, and further represent an activity value that was output by the farming machinery for that geographic area during the defined timeframe. In some aspects, the activity value for the pulse period, and thereby the pulse polygon, can be calculated based on a difference between the first activity data or value and the second activity data or value.

The data translation system 300 can include a spatial grid translating component 330 that can determine, for a selected grid system, a set of grid cells (from the selected grid system) that corresponds to the pulse polygon. In a non-limiting example, the selected grid system can include a set of grid cells that are each located within or located mostly within (e.g., at least 50% is inside, or at least a centroid of the grid cell is inside) the bounds of the generated pulse polygon. It is contemplated that a variety of algorithms for selecting a set of grid cells that "corresponds to" one or more pulse polygons may be employed within the scope of the present disclosure. As such, the spatial grid translating component 330 can identify the set of grid cells of the selected grid system, where the set of grid cells corresponds to or is at least partially bounded by the generated pulse polygon.

The data translation system 300 can further include an agronomic value decoding component 330, which calculates, for each grid cell in the set of grid cells, a corresponding activity value based on the activity value that was determined by the spatial grid translating component 330. Instead of an activity value being assigned to a large plot of land such as the pulse polygon, the agronomic value decoding component 330 can ensure that each grid cell in the set of grid cells is assigned a corresponding activity value. In some aspects, each activity value can be associated with a timestamp, such as one associated with the pulse data from which the pulse polygon activity value was determined. As one may appreciate, if any one of the grid cells in the set of grid cells is selected apart from the others (e.g., for calculating analytics on a very specific area of land corresponding to the grid cell), the calculation of such analytics is now quite plausible because the data for that grid cell is readily available for independent analysis. In other words, by virtue of separating work datasets and/or farming datasets into smaller "containers" of land, the process of analyzing data associated with discrete areas of land becomes a reality.

In some embodiments, the data translation system 300 can include a cell record generating component 350. The cell record generating component 350 can generate, for each grid cell of a plurality of grid cells in a selected spatial grid system, a corresponding data structure also referenced herein as a "cell record" or a "geospatial container." The geospatial container can be stored in a memory, and can include a unique identifier that corresponds to a location of a corresponding grid cell within the selected spatial grid system. In other words, for any grid cell of a spatial grid system, the cell record generating component 350 can generate a geospatial container that identifies the location of the grid cell and can store various types of data (e.g., activity values, soil data, weather data, irrigation data, satellite imagery, other $3^{rd}$ party data) relevant to the grid cell.

In some embodiments, the data translation system 300 can include a cell record layering component 360. The cell record layering component 360 can receive a new activity dataset (e.g., activity value) or farming dataset for a particular geospatial container, and store the corresponding data into a unique portion or layer of the geospatial container. In some embodiments, the activity dataset or farming dataset can be stored as a unique variable value. In some other embodiments, the activity dataset or farming dataset can be stored as a discrete data object within the geospatial container. In some further embodiments, the activity dataset or farming dataset can be stored in association with its corresponding timestamp and/or data type, among other things. In accordance with various embodiments, the cell record layering component 360 can store or layer multiple activity datasets or farming datasets into a geospatial container, such that multiple, unique activity datasets or farming datasets are stored therein. In this regard, each activity dataset or farming dataset stored in a geospatial container can correspond to an operation, activity, imported $3^{rd}$ party data, or any other type of work dataset and/or farming dataset associated with land bounded by the grid cell and associated with the geospatial container.

Figure 4:
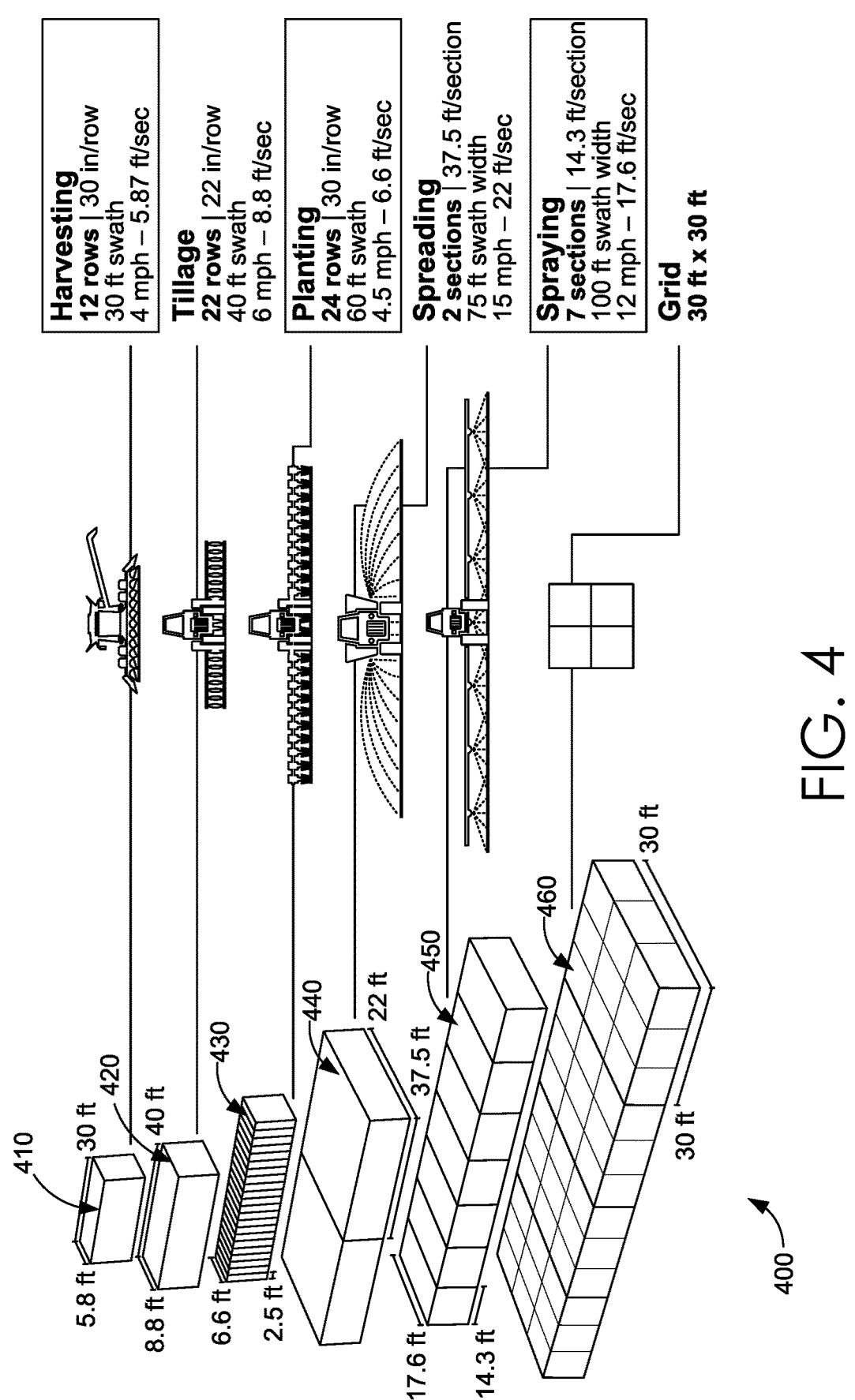
FIG. 4 is an illustration of an exemplary set of pulse polygons generated based on farming machines having implements of variable swath width and performing various farming operations, in accordance with some embodiments of the present invention.

With brief reference now to FIG. 4, the provided illustration 400 depicts an exemplary set of pulse polygons 420, 430, 440, 450, which were generated based on various operations or activities performed by farming machinery and the implements coupled thereto. The illustrations are provided to visually demonstrate that various farming operations or activities can be performed by a farming machine that utilizes implements of variable swath width, and that the operations or activities can be performed at different velocities, thereby causing the generation of variably-sized pulse polygons in accordance with various embodiments described herein. Also depicted is an illustration of an exemplary grid system 460, or at least a portion thereof. The grid system 460 is depicted so that one can visually understand how the pulse polygons 420, 430, 440, 450 could be translated to an underlying grid system, such as exemplary grid system 460.

Figures 5A, 5B:
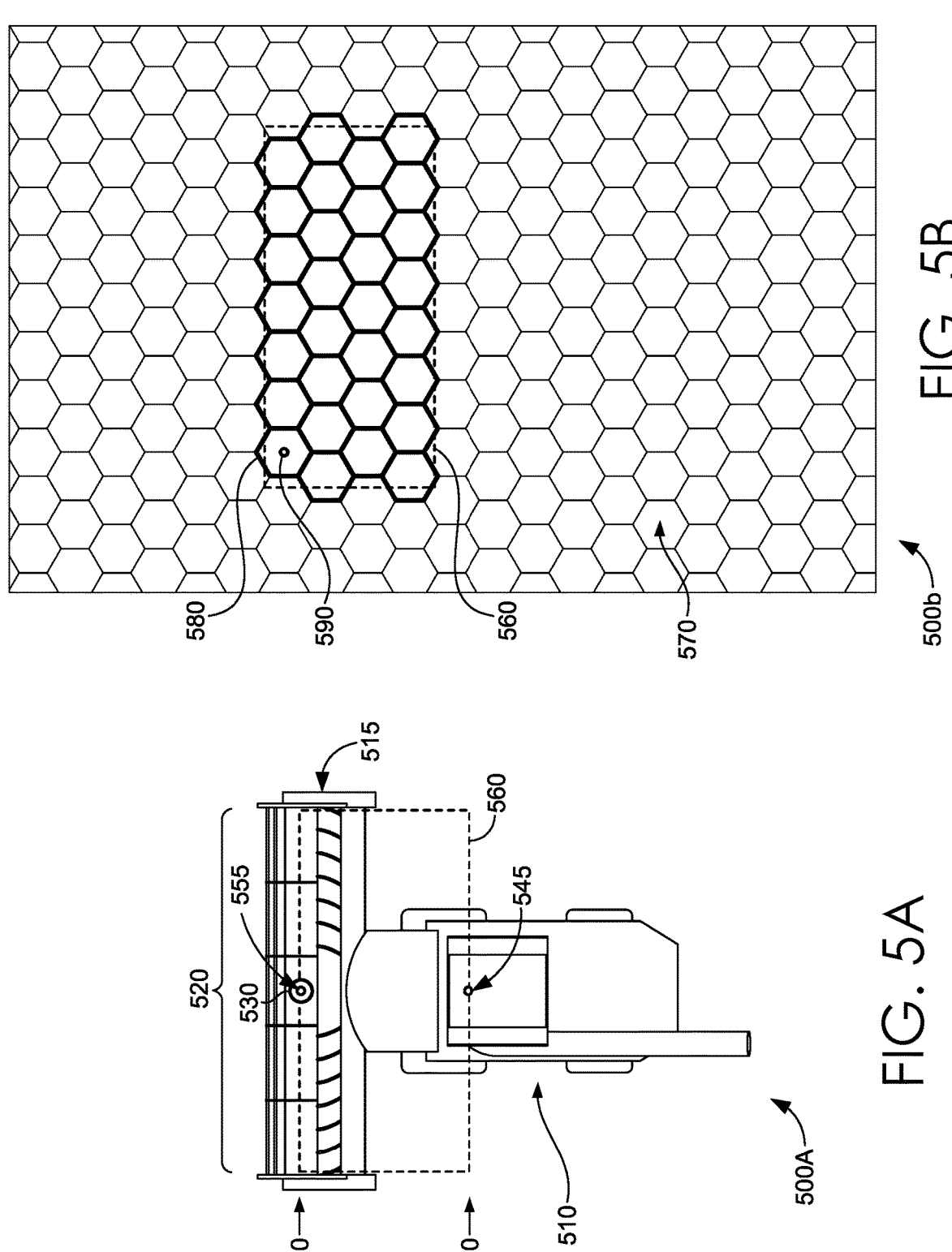
FIG. 5A is top-down view of a farming machine and implement performing a farming operation or activity, in accordance with some embodiments of the present invention.
FIG. 5B is an illustration of an exemplary set of grid cells generated in association with the farming operation or activity of FIG. 5A, in accordance with some embodiments of the present invention.

With reference now to FIG. 5A, an illustration 500A depicts a top-down view of an exemplary farming machine 510 and an implement 515 coupled thereto, having swath width 520. The depicted farming machine 510 and implement 515 are performing a farming operation or activity. For purposes of explanation only, it is assumed that a data collection device, such as data collection device 200 of FIGS. 1 and 2, is detecting location data (e.g., GPS coordinates) from a central position 530 of the implement 515. While not shown, it is contemplated that the data collection device 200 could be fixed anywhere on the implement 530 or the farming machine 510, and that measurements from its fixed position to the central position 530 can be extrapolated and utilized to modify or otherwise adjust the location data at any point in time, such that the location data is adjusted for central position 530.

In the illustration 500A, it is presumed that the farming machine 510 and implement 515 are traveling forward at a fixed velocity (v). The data collection device 200 is collecting and/or generating pulse data at fixed pulse intervals (e.g., once every second). At a first time, t1 540, the data collection device 200 collects location data at position 545. At a second time, t2 550, the data collection device 200 collects additional location data at position 555. Given the swath width 520 of the implement 515 and the location coordinates at position 545 and position 555, a pulse polygon for the pulse period between t1 540 and t2 550, such as pulse polygon 560, can be generated. While not described herein, it is contemplated, as one of ordinary skill may appreciate, that the velocity (v) of the farming machine 510 and implement 515 can be determined based on t1 540, t2 550, the first position 545, and the second position 555. It is also contemplated that values derived from these data points, such as the velocity, among other things, can also be included in the pulse data collected by the data collection device 200.

Looking now to FIG. 5B, depicted in the illustration is the pulse polygon 560 of FIG. 5A being translated into a grid system 500B by a data translation system, such as data translation system 300 of FIG. 3. For purposes of illustration only, the grid system 500B depicted in FIG. 5B utilizes hexagonal grid cells 570, such as the hexagonal grid cells of the Uber H3 grid system, by way of non-limiting example.

It is contemplated that any spatial grid system can be selected for use as the underlying grid system in accordance with the present disclosure. As was described in accordance with the data translation system 300 of FIG. 3, the pulse polygon 560 is mapped to the grid system 500B such that a corresponding set of grid cells (depicted with bold outlines), or at least most of a corresponding set of grid cells, is bound by or is selected to correspond to the pulse polygon 560. Also as described in accordance with the data translation system 300, by way of non-limiting example only, a particular grid cell 580 can be determined to be bound by the pulse polygon 560 so long as its centroid, such as centroid 590, is within the boundaries of the pulse polygon 560. Here, each of the darkened hexagons of the grid system 500B represent unique grid cells that are to be associated with any work data generated and/or collected by data collection device 200 during the relevant pulse period for which the pulse polygon 560 was generated.

Figures 6, 7:
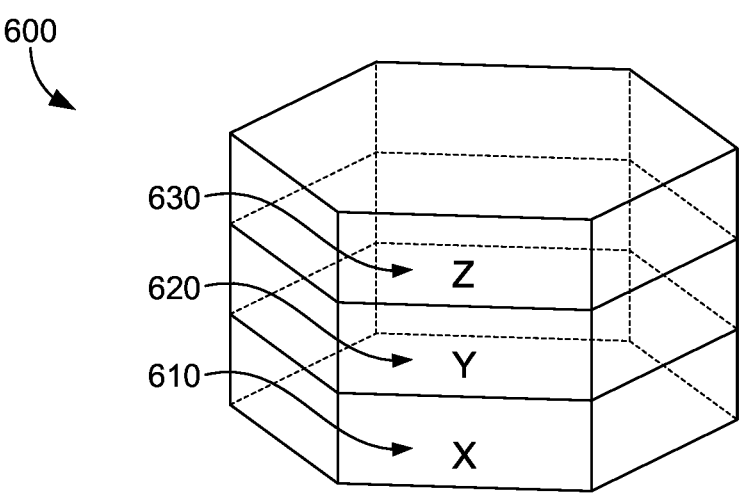
FIG. 6 is an illustration of an exemplary geospatial container generated for storing work datasets and/or farming datasets, in accordance with some embodiments of the present invention.
FIG. 7 is an exemplary data analytics system in accordance with some embodiments of the present invention

With reference to FIG. 6, the illustration depicts a graphical representation of a geospatial container 600 associated with a grid cell of a spatial grid system, such as grid cell 580 of spatial grid system 500B of FIG. 5B. The geospatial container 600 can include a unique identifier that corresponds to its location within the corresponding spatial grid system. Depicted within the geospatial container 600 are a set of unique data layers, such as layer X 610, layer Y 620, and layer Z 630. Each of the layers 610, 620, 630 can represent a unique dataset, which can be translated from a variety of sources (e.g., work datasets, farming datasets). In some aspects, each of the layers 610, 620, 630, can also include or be associated with a temporal identifier. In some embodiments, the temporal identifier can include a time-stamp. In some other embodiments, the temporal identifier can include a job identifier, or some other unique identifier indicating an association with a particular activity or operation performed at some point in time. While embodiments of the present disclosure describe the generation of geospatial containers for grid cells based on new data being received by a data translation system, such as data translation system 300 of FIGS. 1 and 3, it is contemplated that a geospatial container does not necessarily need to be generated by data translation system 300, but can instead be updated thereby, such that new data is stored in an already-existing geospatial container as a new layer or object, among other things.

Looking now to FIG. 7, an exemplary data analytics system 700 for generating data analytics based on work datasets and/or farming datasets stored in one or more geospatial containers is provided. The data analytics system 700 can include one or more computing devices, such as the computing device described in accordance with FIG. 9. It is contemplated that the data analytics system 700 can access one or more stored geospatial containers, such as those generated from data translation system 300 of FIGS. 1 and 3. In various embodiments, the data analytics system 700 can include a query generation component 710, a query processing component 720, a data analytics component 730, and a presentation component 740, among other things.

The query generation component 710 of data analytics system 700 can be configured to receive one or more inputs from a computing device, such as client device 120 of FIG. 1. The inputs can be received in any form, including alphanumeric text, menu/list selections, freehand drawings, defined shapes or zones, and the like. In accordance with various embodiments described herein, the inputs received by query generation component 710 can be received for purposes of generating a query. Responsive to generation of a query, the data analytics system 700 can search for geospatial containers relevant to the query, and analytics that are relevant to the query can be generated. By way of a non-limiting example, a user of client device 120 may wish to generate analytics for a very specific area of land. For instance, assume that the user desires to determine a yield for the specific area of land. Thus, utilizing the client device 120, the user can make a selection of this specific area of land by drawing, utilizing a mouse or a touchscreen by way of example, a circle or other shape precisely around that area of land depicted on a map (e.g., a satellite view of the land). The input facilitating the discrete selection of land can be in any transmittable format, such that the selection can be communicated to the query generation component 710. It is contemplated that any input, including search terms or other land identifying references, can be employed to facilitate a selection. The map that was depicted on the client device 120 can correspond to a particular spatial grid system, such as one that may have been selected by the user. In some embodiments, the query generation component 710 can receive the input/selection, and determine which grid cells correspond to the input/selection received from the user. In some embodiments, the input received from the client device 120 can include a variety of filters, such as one or more references to a particular type of work datasets and/or farming datasets that are stored in the geospatial containers. It is contemplated that such filters can be received as independent queries, or in combination with a selection that corresponds to a portion of land, among other things. In some further embodiments, the input can include analytical queries (e.g., harvest yield based on seed type, pesticide, weather exposure, etc.) that can facilitate the derivation of insights from the data being retrieved. An analytical query can be associated with a set of filters, whereby the formula can require only certain types of work datasets and/or farming datasets be retrieved. In addition, the analytical query can be associated with a formula that can be applied to the relevant work dataset(s), farming dataset(s), and/or any additional inputs as needed from the user to complete the formula.

The query generation component 710 can receive the input(s) from the client device 120, and generate a query that is employed by query processing component 720 to perform a search of geospatial containers relevant to the query. In some embodiments, geospatial containers corresponding to grid cells selected based on the received input can be retrieved by the query processing component 720. In some further embodiments, geospatial containers having work datasets and/or farming datasets relevant to or corresponding to filters and/or an analytical query included in the received input(s) can be determined. In the event an analytical query is received, the query processing component 720 can communicate the relevant or corresponding geospatial containers to data analytics component 730.

In some embodiments, the data analytics component 730 can generate analytical calculations and/or graphical analytics as outputs based on the retrieved geospatial containers and any analytical queries or formulas utilized for processing the relevant data stored in the geospatial containers, if applicable. In various embodiments, outputs generated by the data analytics component 730 can be provided for display via a presentation component 740. The presentation component 740 can facilitate the graphical output of one or more analytical calculations and/or graphical analytics for consumption by the user. While the generation of analytics is described herein as outputs responsive to queries received by a user, it is contemplated that a variety of analytics can be generated automatically, such that predefined queries or other predefined formulas for deriving insights on one or more geospatial containers can be processed to generate analytics for consumption by the user.

Turning now to FIG. 8, a flow diagram 800 is provided that illustrates a method for storing farming activity values into geospatial containers associated with a spatial grid system, in accordance with various embodiments described herein. As shown at block 810, pulse data from a farming machine and/or implement coupled to the farming machine is collected via a sensor device. The pulse data can be collected by a data collection device, such as data collection device 200 of FIGS. 1 and 2. The pulse data received by the data collection device can be associated with a swath width of the implement coupled to the farming machine. That is, a swath width of the implement coupled to the farming machine at the time the pulse data was generated can be associated with the pulse data. In various aspects, the swath width can be defined by a user (e.g., via a client device 120) associated with the data collection device 200, or the swath width can be automatically determined based on the obtained pulse data. As described herein, the pulse data can include a work dataset, which may include machine data and/or agronomic data, among other things. The machine data can include activity data indicative of an operation being performed, which is measured or otherwise logged by the farming machine and collected by the data collection device. In some embodiments, the pulse data can be communicated from the data collection device to a server, such as a data translation system 300 of FIGS. 1 and 3, via a network. In some other embodiments, the pulse data can be obtained by a variety of data transfer techniques, such as a computer readable media, bulk download, or the like.

Subsequently, at block 820, a pulse polygon can be generated based on one or more of the obtained pulse dataset(s), and the swath width associated with the pulse dataset(s). As the pulse dataset(s) can include, among other things, location data (e.g., GPS coordinates), CAN data (e.g., velocity, temperature), activity data, agronomic data, or any other data that can be collected by the data collection device, the data translation system can calculate a variety of useful datasets, such as the pulse polygon. In accordance with various embodiments, the generated pulse polygon can define a geographic area that was physically traversed by the implement coupled to the farming machine when or immediately before the pulse data was generated.

In some aspects, a first side of the pulse polygon can be generated based on location data associated with a first time (e.g., the beginning of a pulse period), and a second side of the pulse polygon can be generated based on location data associated with a second time (e.g., the end of the pulse period), both of which can be utilized to determine a length of the pulse polygon. In some further aspects, a third and fourth side of the pulse polygon can be generated based further on the swath width associated with the pulse data, whereby the swath width can be utilized to determine a width of the pulse polygon. The pulse polygon, given a determined width and length, can define an area of land (i.e., a geographic area) that was traversed by the farming machine and/or implement. In accordance with various embodiments described herein, the location data associated with the first time can define a center point of the first side of the pulse polygon, while the location data associated with the second time can define a center point of the second side of the pulse polygon. In some aspects, an activity value that defines an amount of work performed by the farming machine and/or implement over the pulse period can be extracted from the obtained pulse data, or determined based on work data extracted from the obtained pulse data. In some aspects, the obtained pulse data can specifically define the activity value for the pulse period. In some other aspects, the activity value can be determined based on a difference between activity values of a first pulse period and a second pulse period immediately preceding the first pulse period.

At block 830, the data translation system can translate the generated pulse polygon into one or more grid cells of a plurality of grid cells in a spatial grid system. As described herein the spatial grid system can be defined by the user of a client device, or defined by an administrator of the data translation system. In some embodiments, the spatial grid system can be defined based on a selection made from a listed plurality of spatial grid systems, such as one provided by the data translation system for display on the client device. The data translation system can geographically map the generated pulse polygon onto the selected spatial grid system, and determine which grid cells of the selected spatial grid system correspond to the generated pulse polygon. In a non-limiting example, the data translation system can analyze each grid cell of at least a portion of the selected spatial grid system to determine whether a center point of the grid cell is inside or bounded by the generated pulse polygon. The data translation system can determine that a grid cell is within the generated pulse polygon if its center point is geographically located within the boundaries of the pulse polygon.

For each grid cell determined to correspond to the generated pulse polygon, the data translation system can, in some embodiments, generate a geospatial container that corresponds to the grid cell. That is, the geospatial container can be generated to include a unique identifier that corresponds to the location of the corresponding grid cell. The data translation system can store the geospatial container into a memory, such as data store 110 of FIG. 1, so that additional work data and/or agronomic data associated with the grid cell can be stored therein. Once the geospatial container is generated and stored, the data translation system can store, into a unique portion or layer of the geospatial container, the activity value determined for the pulse polygon. In some other embodiments, if a geospatial container corresponding to the grid cell is determined to exist, the data translation system can retrieve the geospatial container and store, into a unique portion or layer of the geospatial container, the activity value determined for the pulse polygon. In this way, each unique work dataset and/or agronomic dataset received in pulse data can be stored into a corresponding set of grid cells for subsequent retrieval and/or analysis. In some further embodiments and as described herein, the data translation system can store, into a unique portion or layer of the geospatial container, imported farming datasets (e.g., soil data, weather data, irrigation data, satellite imagery, or other $3^{rd}$ party data) based on geographic data associated with the farming datasets.

As described herein, a data analytics system, such as data analytics system 700 of FIG. 7, can be employed to generate queries that, when processed, can retrieve relevant geospatial containers. The determined relevant geospatial containers can be analyzed so that insights or other data analytics can be generated for a very specific portion of land selected by a user. For instance, and by way of non-limiting example, a harvest yield value for a certain portion of land can be calculated and compared to another harvest yield value calculated for another portion of land. In the alternative, the geospatial containers also facilitate the ability to define, with greater accuracy, specific portions of land that may be associated with certain aspects of the data or associated with insights derived from the data. For instance and by way of non-limiting example, a user may wish to compare harvest yields for portions of land that were planted with different seed varieties, or those that may have been affected by other variables (e.g., pesticides, irrigation, weather, soil, etc.).

Having described embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention provide for, among other things, storing farming activity values from geospatial containers associated with a spatial grid system and generating data analytics therefrom. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:

obtaining pulse data collected via a sensor device coupled to a farming machine, the pulse data including machine CAN data and agronomic data and being associated with a swath width of an implement coupled to the farming machine;

generating a pulse polygon based on the pulse data and the associated swath width, the generated pulse polygon defining a geographic area traversed by the implement and having an activity value associated with a temporal identifier determined based on the pulse data;

generating a plurality of geospatial containers based on the pulse polygon, each geospatial container of the plurality of geospatial containers corresponding to one of a plurality of grid cells in a spatial grid system, wherein each geospatial container comprises (i) a unique identifier corresponding to a location of the grid cell within the spatial grid system and (ii) a plurality of discrete portions each configured to store a respective data layer, wherein the geospatial containers are indexed by the unique identifier and each discrete portion is addressable by the temporal identifier; and storing the activity value into the plurality of geospatial containers, the activity value being stored within a discrete portion of each geospatial container of the plurality of geospatial containers, each discrete portion being associated with the temporal identifier, wherein storing comprises updating an already-existing geospatial container by appending the activity value as a new data layer within the discrete portion associated with the temporal identifier while retaining at least one previously stored data layer associated with a different temporal identifier.

2. The medium of claim 1, wherein the pulse data includes a first location identifier associated with a first time and a second location identifier associated with a second time, the pulse polygon being generated based on the associated swath width, the first location identifier, and the second location identifier.

3. The medium of claim 2, wherein the second time corresponds to a time interval immediately following the first time.

4. The medium of claim 2, wherein the pulse data includes a first activity value associated with the first time and a second activity value associated with the second time, the activity value being determined based at least in part on the second activity value.

5. The medium of claim 1, wherein the activity value is determined based on the machine CAN data and the agronomic data.

6. The medium of claim 1, wherein the plurality of geospatial containers is generated based further on a determination that a centroid of each grid cell in the plurality of grid cells is located within the defined geographic area.

7. The medium of claim 1, the operations further comprising:

receiving a query that references (i) a grid cell of the spatial grid system and (ii) the temporal identifier;

determining a geospatial container corresponding to the referenced grid cell based on the unique identifier;

retrieving the activity value from the discrete portion associated with the temporal identifier; and generating a result based at least in part on the retrieved activity value.

8. The medium of claim 1, the operations further comprising:

obtaining a farming dataset value associated with the defined geographic area; and storing the farming dataset value into the plurality of geospatial containers, the farming dataset value being stored within another discrete portion of each geospatial container of the plurality of geospatial containers.

9. The medium of claim 8, the operations further comprising:

receiving a query that references a first grid cell associated with the spatial grid system;

determining that the referenced first grid cell corresponds to a first geospatial container of the plurality of geospatial containers based on the unique identifier; and generating a result based at least in part on the activity value and the farming dataset value stored in the first geospatial container.

10. The medium of claim 1, wherein updating the already-existing geospatial container comprises storing the activity value as the new data layer while retaining at least one previously stored data layer in the geospatial container that is associated with a different temporal identifier.

11. A computer-implemented method, comprising:

obtaining, by a computing device, pulse data collected via a sensor device coupled to a farming machine, the pulse data including both machine CAN data and agronomic data and having a first location identifier associated with a first time and a second location identifier associated with a second time and being associated with a swath width of an implement coupled to the farming machine;

generating, by the computing device, a pulse polygon based on the first location identifier, the second location identifier, and the associated swath width, the generated pulse polygon defining a geographic area traversed by the implement and having an activity value associated with a temporal identifier determined based on the pulse data;

generating a plurality of geospatial containers based on the pulse polygon, each geospatial container of the plurality of geospatial containers corresponding to one of a plurality of grid cells in a spatial grid system, wherein each geospatial container comprises (i) a unique identifier corresponding to a location of the grid cell within the spatial grid system and (ii) a plurality of discrete portions each configured to store a respective data layer, wherein the geospatial containers are indexed by the unique identifier and each discrete portion is addressable by the temporal identifier; and storing, by the computing device, the activity value into the plurality of geospatial containers, the activity value being stored within a discrete portion of each geospatial container of the plurality of geospatial containers, each discrete portion being associated with the temporal identifier, wherein storing comprises updating an already-existing geospatial container by appending the activity value as a new data layer within the discrete portion associated with the temporal identifier while retaining at least one previously stored data layer associated with a different temporal identifier.

12. The method of claim 11, wherein the plurality of geospatial containers is generated based further on a determination that a centroid of each grid cell in the plurality of grid cells is located within the defined geographic area.

13. The method of claim 11, further comprising:

receiving, by the computing device, a query that references (i) a grid cell of the spatial grid system and (ii) the temporal identifier;

determining, by the computing device, a geospatial container corresponding to the referenced grid cell based on the unique identifier;

retrieving, by the computing device, the activity value from the discrete portion associated with the temporal identifier; and generating, by the computing device, a result based at least in part on the retrieved activity value.

14. The method of claim 11, wherein the temporal identifier comprises a timestamp or a job identifier.

15. A system comprising:

at least one processor, and a machine-readable hardware storage device storing instructions that, when utilized by the at least one processor, cause the at least one processor to perform operations comprising:

obtaining a pulse dataset of a plurality of pulse datasets collected via a sensor device coupled to a farming machine, the pulse dataset including machine CAN data and agronomic data output via the farming machine and being associated with a swath width of an implement coupled to the farming machine;

generating a pulse polygon based on the pulse dataset and the associated swath width, the generated pulse polygon defining a geographic area traversed by the implement and having an activity value associated with a temporal identifier determined based on the pulse dataset;

generating a plurality of geospatial containers based on the pulse polygon, each geospatial container of the plurality of geospatial containers corresponding to one of a plurality of grid cells in a spatial grid system, wherein each geospatial container comprises (i) a unique identifier corresponding to a location of the grid cell within the spatial grid system and (ii) a plurality of discrete portions each configured to store a respective data layer, wherein the geospatial containers are indexed by the unique identifier and each discrete portion is addressable by the temporal identifier; and storing the activity value into the plurality of geospatial containers, the activity value being stored within a discrete portion of each geospatial container of the plurality of geospatial containers, each discrete portion being associated with the temporal identifier, wherein storing comprises updating an already-existing geospatial container by appending the activity value as a new data layer within the discrete portion associated with the temporal identifier while retaining at least one previously stored data layer associated with a different temporal identifier.

16. The system of claim 15, wherein the plurality of pulse datasets is collected at equidistant time intervals.

17. The system of claim 15, wherein the plurality of geospatial containers is generated based further on a determination that a centroid of each grid cell in the plurality of grid cells is located within the defined geographic area.

18. The system of claim 15, the operations further comprising:

receiving a query that references (i) a grid cell of the spatial grid system and (ii) the temporal identifier;

determining a geospatial container corresponding to the referenced grid cell based on the unique identifier;

retrieving the activity value from the discrete portion associated with the temporal identifier; and generating a result based at least in part on the retrieved activity value.

19. The system of claim 15, wherein the activity value is determined based on both the machine CAN data and the agronomic data from the pulse dataset.

* * * * *